US012606481B2

(12) United States Patent
Ye et al.

(10) Patent No.: US 12,606,481 B2
(45) Date of Patent: Apr. 21, 2026

(54) SIZING COMPOSITIONS FOR GLASS FIBER DIRECT ROVING FOR PRODUCING MULTIAXIAL FABRICS, AND PREPARATION METHODS AND APPLICATIONS THEREOF

(71) Applicant: JUSHI GROUP CO., LTD, Tongxiang City (CN)

(72) Inventors: Fenglin Ye, Tongxiang City (CN); Qifeng Fei, Tongxiang City (CN); Juan Liu, Tongxiang City (CN); Hongya Zhou, Tongxiang City (CN); Bilong Dai, Tongxiang City (CN)

(73) Assignee: Jushi Group Co., Ltd., Tongxiang City (CN)

( * ) Notice: Subject to any disclaimer, the term of this patent is extended or adjusted under 35 U.S.C. 154(b) by 719 days.

(21) Appl. No.: 17/595,150

(22) PCT Filed: Oct. 27, 2020

(86) PCT No.: PCT/CN2020/123873
§ 371 (c)(1),
(2) Date: Nov. 10, 2021

(87) PCT Pub. No.: WO2021/243929
PCT Pub. Date: Dec. 9, 2021

(65) Prior Publication Data
US 2022/0306529 A1 Sep. 29, 2022

(30) Foreign Application Priority Data
Jun. 5, 2020 (CN) .......................... 202010507676.5

(51) Int. Cl.
| | |
|---|---|
| *C03C 25/36* | (2006.01) |
| *C03C 25/1095* | (2018.01) |
| *C03C 25/26* | (2018.01) |
| *D06M 13/17* | (2006.01) |
| *D06M 13/513* | (2006.01) |
| *D06M 15/507* | (2006.01) |
| *D06M 15/55* | (2006.01) |

(52) U.S. Cl.
CPC .......... *C03C 25/36* (2013.01); *C03C 25/1095* (2013.01); *C03C 25/26* (2013.01); *D06M 13/17* (2013.01); *D06M 13/5135* (2013.01); *D06M 15/507* (2013.01); *D06M 15/55* (2013.01); *D10B 2101/06* (2013.01); *D10B 2401/062* (2013.01); *D10B 2403/02412* (2013.01)

(58) Field of Classification Search
CPC ... Y10T 442/24; C03C 25/36; C03C 25/1095; C03C 25/26; C03C 25/40; D06M 13/17; D06M 13/5135; D06M 15/507; D06M 15/55; D06M 13/513; D06M 13/188; D06M 13/207; D06M 13/507; D06M 15/65; D10B 2101/06; D10B 2401/062; D10B 2403/02412; C08K 5/5415
See application file for complete search history.

(56) References Cited

U.S. PATENT DOCUMENTS

| | | | | |
|---|---|---|---|---|
| 5,016,451 | A | * | 5/1991 | Tsukabayashi ....... D06M 10/02 68/2 |
| 5,883,021 | A | * | 3/1999 | Beer ....................... B29C 70/08 162/149 |
| 2006/0204763 | A1 | * | 9/2006 | Hartman ................. C08L 63/00 525/476 |
| 2014/0038481 | A1 | * | 2/2014 | Chen ....................... D04H 1/587 428/327 |

FOREIGN PATENT DOCUMENTS

| | | | | |
|---|---|---|---|---|
| CN | 105174751 | A | 12/2015 | |
| CN | 108249783 | A * | 7/2018 | ............. C03C 25/32 |
| CN | 108330691 | A | 7/2018 | |
| CN | 110294600 | A | 10/2019 | |
| CN | 110482879 | A | 11/2019 | |
| CN | 110818284 | A | 2/2020 | |
| CN | 111102038 | A | 5/2020 | |
| CN | 111663332 | A | 9/2020 | |
| JP | 2017193467 | A | 10/2017 | |
| KR | 101929095 | B1 | 12/2018 | |

OTHER PUBLICATIONS

Translation CN 108249783A (Year: 2018).*
International Search Report cited in PCT/CN2020/123873 mailed Mar. 10, 2021, 10 pages.
CN Office Action and English Translation cited in CN202010507676.5 mailed Feb. 20, 2021, 11 pages.

* cited by examiner

*Primary Examiner* — Elizabeth M Imani
(74) *Attorney, Agent, or Firm* — Cooper Legal Group, LLC

(57) ABSTRACT
A sizing composition for glass fiber direct roving for producing multiaxial fabrics is provided. The sizing composition includes, based on the total solids mass of the composition, 0.1 to 5.0% by solid mass of a first silane coupling agent, 2.5 to 11.0% by solid mass of a second silane coupling agent, 3.0 to 20.0% by solid mass of a first film former, 45.0 to 75.0% by solid mass of a second film former, 0 to 5.0% by solid mass of a plasticizer, 0.2 to 4.0% by solid mass of a first lubricant, 5.0 to 20.0% by solid mass of a second lubricant, and 0.01 to 3.0% by solid mass of a pH regulator. The first film former is a multifunctional epoxy emulsion, and the second film former is a low-molecular-weight liquid epoxy emulsion.

9 Claims, No Drawings

1

SIZING COMPOSITIONS FOR GLASS FIBER DIRECT ROVING FOR PRODUCING MULTIAXIAL FABRICS, AND PREPARATION METHODS AND APPLICATIONS THEREOF

This application is a 371 of PCT/CN2020/123873 filed Oct. 27, 2020.

CROSS-REFERENCE TO RELATED APPLICATION

The present application claims priority to Chinese Patent Application No. 202010507676.5, filed to the China National Intellectual Property Administration on Jun. 5, 2020 and entitled "Sizing Compositions for Glass Fiber Direct Roving for Producing Multiaxial Fabrics, and Preparation Methods and Applications Thereof", the disclosure of which is incorporated herein by reference in its entirety.

TECHNICAL FIELD

The present application relates to but is not limited to the field of coating technology on the surface of glass fiber, in particular to a sizing composition for glass fiber direct roving to produce multiaxial fabrics for wind turbine blades, and to a preparation method and an application thereof.

BACKGROUND

Wind power is a renewable green energy and has good market potential. One of the main materials for manufacturing wind power turbine blades and other important structural parts is glass fiber multiaxial fabric. The wind turbine blades manufactured by using the glass fiber multiaxial fabrics have the advantages of light weight, high strength and high rigidity, which can meet the requirements of large size, light weight, high performance, and low cost in developing wind turbine blades.

Sizing compositions play a very important role in determining the properties of glass fiber multiaxial fabrics. They not only affect the weaving smoothness of multiaxial fabrics, but also determine the wet-out speed of the fabrics as well as the mechanical properties and fatigue properties of glass fiber reinforced composites. For the multiaxial fabrics that contain a glass fiber coated with an existing sizing composition, the dissolution rate of the sizing composition in the resin is either too low or too high. When the sizing composition has too low a dissolution rate, the glass fiber and the resin in the fabric will have poor bonding and a problem of white fibers will occur, as the resin fails to fully impregnate the glass fiber in the vacuum infusion process. On the other hand, if the sizing composition dissolves too fast, the sizing composition in the multiaxial fabric will dissolve unduly in advance during the process of vacuum infusion. Consequently, the gaps between upper layers of the fabric will disappear, and so it will not be easy for the fabric to be penetrated by the resin. In that case, the resin will be hindered from continuing to penetrate into the lower layers of the fabric, resulting in the lack of resin in the corners and edges of the lower layers and hence a reduction in the yield.

Therefore, there remains an urgent need to develop a sizing composition for glass fiber direct roving for producing multiaxial fabrics, so as to properly control the dissolution rate of the sizing composition in the resin, and effectively solve the above-mentioned problems and defects of the existing glass fiber sizing compositions.

2

SUMMARY

The present application aims to provide a sizing composition for glass fiber direct roving for producing multiaxial fabrics. The sizing composition has a suitable dissolution rate in the resin and good compatibility with the resin. It can modify the physical and chemical properties of the surface of glass fiber, improve various performances of glass fiber, and thus meet use requirements for producing glass fiber multiaxial fabrics. The wind turbine blades made from the glass fiber multiaxial fabrics containing the sizing composition according to the present application have the advantages such as stable mechanical strength, excellent fatigue resistance, and longer service life.

Accordingly, a first aspect of the present application relates to a sizing composition for glass fiber direct roving for producing multiaxial fabrics. The composition comprises the following components, a solid mass of each of the following components accounting for a total solids mass of the sizing composition expressed in percentage by mass as follows:

| | |
|---|---|
| a first silane coupling agent | 0.1-5.0%; |
| a second silane coupling agent | 2.5-11.0%; |
| a first film former | 3.0-20.0%; |
| a second film former | 45.0-75.0%; |
| a plasticizer | 0-5.0%; |
| a first lubricant | 0.2-4.0%; |
| a second lubricant | 5.0-20.0%; |
| pH regulator | 0.01-3.0%; | wherein, the first film former is a multifunctional epoxy emulsion, and the multifunctional epoxy is a polyphenol epoxy emulsion and/or a glycidyl amine epoxy emulsion, and the second film former is a low-molecular-weight liquid epoxy emulsion; and the solids mass of the sizing composition accounts for 10-15% of the total mass of the composition, and the remainder of the sizing composition is deionized water.

In one embodiment of the present application, the solid mass content of each component is expressed in percentage by mass as follows:

| | |
|---|---|
| the first silane coupling agent | 0.5-1.5%; |
| the second silane coupling agent | 3.5-7.0%; |
| the first film former | 7.0-16.0%; |
| the second film former | 50.0-65.0%; |
| t plasticizer | 0-3.0%; |
| the first lubricant | 0.5-2.0%; |
| the second lubricant | 9.0-16.0%; |
| pH regulator | 0.01-2.00%. |

In one embodiment of the present application, the polyphenol epoxy emulsion is one or more of a 4,4'-diamino diphenyl methane tetrafunctional epoxy resin emulsion, a triglycidyl p-aminophenol trifunctional epoxy emulsion, and an epoxidized m-xylylenediamine tetrafunctional epoxy resin emulsion; and the glycidyl amine epoxy emulsion is one or more of a dicyclopentadiene phenol glycidyl ester resin, an epoxidized m-xylylenediamine, a 1, 1, 1-tris (p-hydroxyphenyl) ethane glycidyl ether trifunctional epoxy emulsion, a tetra (4-hydroxyphenyl) ethane tetraglycidyl ether tetrafunctional epoxy emulsion, and a 1,3-bis (N, N-diglycidyl aminomethyl) cyclohexane tetrafunctional epoxy emulsion.

In one embodiment of the present application, the low-molecular-weight liquid epoxy emulsion is one or more of a glycidyl ester epoxy emulsion, an aliphatic glycidyl ether epoxy emulsion, a bisphenol A epoxy emulsion, a bisphenol F epoxy emulsion, a bisphenol AD epoxy emulsion, and a bisphenol S epoxy emulsion; and the low-molecular-weight liquid epoxy emulsion has an epoxy equivalent of 180-300 and an emulsion particle size of 0.2-2.0 microns.

In one embodiment of the present application, the first silane coupling agent is one or more of a γ-aminopropyl triethoxy silane, a γ-aminopropyl trimethoxy silane, an N-β-(aminoethyl)-γ-aminopropyl trimethoxy silane, a γ-glycidyl etherpropyl trimethoxy silane, a 3-glycidyl propyl methoxydiethyloxy silane, and a γ-methacryloyloxypropyl trimethoxy silane.

In one embodiment of the present application, the second silane coupling agent is one or more of an N-phenyl-N-aminoethyl-γ-aminopropyl trioxysilane hydrochloride, a cationic styrene aminotrimethoxy silane, and a polynitrogen amide silane.

In one embodiment of the present application, the plasticizer is one or more of a saturated polyester plasticizer, a polymeric benzoate ester plasticizer, a benzoate ester plasticizer, an adipate polymer plasticizer, and a polyol ester plasticizer.

In one embodiment of the present application, the first lubricant is one or more of a fatty acid amine, a fatty amide polycondensate, and an epoxy modified phenylsiloxane, and the second lubricant is a polyethylene glycol (PEG) lubricant.

In one embodiment of the present application, the pH regulator is one or more of a citric acid, a boric acid, a formic acid, an acetic acid, and an organic amine.

The sizing composition according to the present application is prepared by using a silane coupling agent, a film former, a plasticizer, a lubricant, a pH regulator, and deionized water; wherein the solids mass of the sizing composition accounts for 10%-15% of the total mass of the sizing composition.

In the sizing composition for glass fiber direct roving for producing multiaxial fabrics according to the present application, the silane coupling agent has a molecular structure consisting of an organic functional group and an inorganic functional group. The inorganic functional group can react with the hydroxyl group on the surface of glass, and the organic functional group can react with the reinforced matrix resin and can play a role of a bridge. In addition, the silane coupling agent can make up for the microcracks of glass fiber in the fiber drawing process so as to protect the glass fiber. Therefore, the selection of an appropriate silane coupling agent can help improve the mechanical strength, aging resistance and service life of glass fiber reinforced composites.

Silane coupling agents commonly used for producing glass fiber include vinyl coupling agents, methacryloxy coupling agents, amino coupling agents, epoxy coupling agents, etc. The silane coupling agent in the sizing composition according to the present application comprises a first silane coupling agent and a second silane coupling agent. The first silane coupling agent is one or more of a γ-aminopropyl triethoxy silane, a γ-aminopropyl trimethoxy silane, an N-β-(aminoethyl)-γ-aminopropyl trimethoxy silane, a γ-glycidyl ether propyl trimethoxy silane, a 3-glycidyl propyl methoxy diethyloxy silane, and a γ-methacryloyloxy propyl trimethoxy silane; preferably, the first silane coupling agent is selected from one of a γ-aminopropyl triethoxy silane, a γ-glycidyl ether propyl trimethoxy silane, a 3-glycidyl propyl methoxy diethyloxy silane, and a γ-methacryloyloxy propyl trimethoxy silane. The second silane coupling agent is selected from one of a cationic styrene amino trimethyl silane, an N-phenyl-N-aminoethyl-γ-aminopropyl trioxy silane hydrochloride, and a polynitrogen amide silane.

The first silane coupling agent used in an embodiment of the present application has good compatibility with the epoxy resin, and can significantly improve the bonding strength between the coated glass fiber and the matrix resin. The second silane coupling agent used in an embodiment of the present application has a group which occupies a large space around the active reaction center, thus creating a steric effect around the active reaction center, so that the speed of reaction between the second silane coupling agent and the matrix resin can be significantly slowed down, the gelation time of the matrix resin can be prolonged, and the penetration effect of the matrix resin in wetting out the multiaxial fabric can be improved.

The amount of the silane coupling agent introduced in a sizing composition needs to be controlled within a reasonable range. Too small an amount would result in an insufficient interfacial bridging effect, thus affecting the bonding effect between glass fiber and the matrix resin and further leading to insufficient mechanical properties of composites; on the other hand, if the introduced amount becomes too large, the corresponding active components would have been saturated, which will cause a waste and increase the manufacturing cost of glass fiber.

In the present application, the inventor has found through a large number of experimental studies that, when the solid content of the first silane coupling agent accounts for 0.1% to 5.0% of the total solids content of the sizing composition, and the solid content of the second silane coupling agent accounts for 2.5% to 11.0% of the total solids content of the sizing composition, the performance indexes of the resulting glass fiber reinforced composites would well meet the requirements. Preferably, the solid content of the first silane coupling agent accounts for 0.5% to 1.5% of the total solids content of the sizing composition, and the solid content of the second silane coupling agent accounts for 3.5% to 7.0% of the total solids content of the sizing composition.

The film former is one of the important components of a sizing composition for glass fiber. It plays a role in determining not only the production and processing performance of glass fiber, and also the properties of fiber-reinforced resin composites. In addition, the film former also protects glass fiber in the fiber drawing process and improves the compatibility between glass fiber and matrix resin. Selecting an appropriate film former will ensure the integrity of strands, the smoothness in subsequent use, and the rapid wet-out of glass fiber, so as to enable a homogeneous mixture of the glass fiber and the matrix resin, and further a sufficient and complete interfacial bonding effect.

In the present application, the film former comprises a first film former and a second film former. The first film former is a multifunctional epoxy emulsion, which can improve the reactivity of the glass fiber with the resin and increase the mechanical strength of composite materials. The multifunctional epoxy emulsion according to the present application is one or more of a 4,4'-two amino two benzene methane tetrafunctional epoxy resin emulsion, a triglycidyl p-aminophenol trifunctional epoxy emulsion, an epoxidized m-xylylenediamine tetrafunctional epoxy resin emulsion, a dicyclopentadiene phenol glycidyl ester resin, an epoxidized m-xylylenediamine, a 1, 1, 1-tri (p-hydroxyphenyl) ethane glycidyl ether trifunctional epoxy emulsion, a tetra (4-hydroxyphenyl) ethane tetraglycidyl ether tetrafunctional epoxy resin emulsion, and a 1,3-bis (N, N-diglycidyl aminomethyl) cyclohexane tetrafunctional epoxy resin emulsion; preferably, the multifunctional epoxy emulsion is either an epoxidized m-xylylenediamine tetrafunctional epoxy resin emulsion or a 1,3-bis (N, N-diglycidyl aminomethyl) cyclohexane tetrafunctional epoxy resin emulsion.

The second film former is a low-molecular-weight liquid epoxy emulsion. It has an epoxy equivalent in the range from 180 to 300 and an emulsion particle size from 0.2 to 2.0 microns. Relevant researches show that, when the epoxy equivalent of the liquid epoxy emulsion is less than 180, the direct roving thus prepared would be too soft, and when the epoxy equivalent is greater than 300, the direct roving would be too stiff. In both cases, the use performance of direct roving will be negatively affected. An epoxy equivalent of 180 to 300 will help ensure the glass fiber has a moderate stiffness. The size of the solutes in the emulsion is also a key factor. When the solutes have a particle size of less than 0.2 microns, the emulsion containing such solutes would easily be thrown out of the sizing trough with the rotating of the sizing application roller, which will cause wastes; the solutes with excessively big particle size would, on the other hand, tend to settle, which will then cause inhomogeneity of the emulsion and further an undesired impact on the quality of the yarn. The low-molecular-weight liquid epoxy emulsion is one or more of a glycidyl ester epoxy emulsion, an aliphatic glycidyl ether epoxy emulsion, a bisphenol A epoxy emulsion, a bisphenol F epoxy emulsion, a bisphenol AD epoxy emulsion, and a bisphenol S epoxy emulsion. Preferably, the low-molecular-weight epoxy emulsion is a bisphenol A epoxy emulsion and/or a bisphenol F epoxy emulsion.

In the present application, the ratio of the low-molecular-weight epoxy emulsion to the multifunctional epoxy emulsion is adjusted so as to control the dissolution rate of glass fiber in resin (the dissolution rate is characterized by testing the dissolution rate of sizing in acetone). With an appropriate control of the dissolution rate of sizing in acetone, the glass fiber fabric can be prevented from disintegrating prematurely during being impregnated by the matrix resin; at the same time, the glass fiber fabric retains sufficient gaps for the resin to penetrate, so that a full wet-out of fabric by the resin can be ensured. It is found through experiments that the dissolution rate of sizing in acetone should be controlled at a range of 70-85%. To achieve that range, the content of the first film former should be controlled at 3.0-20.0%, and the content of the second film former should be controlled at 45.0-75.0%. Preferably, the content of the first film former is 7.0-16.0%, and the content of the second film former is 50.0-65.0%.

In the present application, the use of a combination of film formers and silane coupling agents, where the film formers consist of a multifunctional epoxy emulsion and a low-molecular-weight epoxy emulsion, especially the silane coupling agents comprising a γ-glycidyl ether propyl trimethoxy silane coupling agent and a cationic styrene amino trimethoxy silane coupling agent, can improve the compatibility between glass fiber and resin, enhance the crosslinking density of glass fiber reinforced composites, and thus increase the mechanical strength and modulus of composites.

A plasticizer may be selectively added to the sizing composition according to the present application. The plasticizer mainly serves to improve the flexibility and wettability of the film former, reduce the amount of fuzz generated in the production and processing of glass fiber, and retard the reaction of multifunctional epoxy emulsion with other components during the manufacturing process of glass fiber. In some embodiments of the present application, the plasticizer is one or more of a saturated polyester plasticizer, a polymeric benzoate ester plasticizer, a benzoate ester plasticizer, an adipate polymer plasticizer, and a polyol ester plasticizer. Experiments show that an appropriate increase of plasticizer content in a sizing composition helps to improve the plasticity of glass fiber direct roving; however, when the content goes too high, the roving will become unfavorably soft and its integrity performance will decline. Therefore, the content of plasticizer is restricted to be 0-5.0%, preferably 0-3.0%.

In the sizing composition according to the present application, the lubricant includes a first lubricant and a second lubricant. The first lubricant is one or more of a fatty acid amine, a fatty amide polycondensate and an epoxy modified phenyl siloxane; and the second lubricant is a PEG lubricant. Preferably, the lubricant is a combination of an epoxy modified phenyl siloxane with good surface smoothness and a PEG lubricant. In the sizing composition according to the present application, the content of the first lubricant is 0.2-4.0%, preferably 0.5-2.0%. Preferably, the first lubricant is an epoxy modified phenyl siloxane and/or a fatty amide polycondensate. The content of the second lubricant is 5.0-20.0%, preferably 9.0-16.0%. Preferably, the second lubricant is PEG 400 MO. The use of a combination of lubricants can help improve the surface lubricity of glass fiber and, by solving the problem of resin in impregnating glass fiber multiaxial fabric, improve the wet-out speed and effect.

In the sizing composition according to the present application, the pH regulator is one or more of a formic acid, an acetic acid, a citric acid, and an organic amine. The content of the pH regulator is 0.01-3.0%, preferably 0.01-2.0%.

Another aspect of the present application relates to a method of preparing a sizing composition for glass fiber direct roving for producing multiaxial fabrics, and the method comprises the following steps:

1) pre-dispersing the first silane coupling agent and the second silane coupling agent in the process as described below:

adding deionized water and part of the pH regulator into a first vessel, and, while stirring the newly added substances, adding the first silane coupling agent into the first vessel;

adding deionized water and the remaining pH regulator into a second vessel, and, while stirring the newly added substances, adding the second silane coupling agent and deionized water with a mass of 15-30 times the mass of the second silane coupling agent;

2) pre-dissolving the first lubricant and the second lubricant in the process as described below:

sequentially adding deionized water and the first lubricant into a third vessel, and stirring the mixture till the first lubricant is fully dissolved;

adding deionized water and the second lubricant into a fourth vessel, and stirring the mixture till the second lubricant is fully dissolved;

3) pre-dissolving and diluting the first film former and the second film former in the process as described below:

adding the first film former and deionized water into a fifth vessel, and stirring the mixture till the first film former is dissolved;

adding the second film former and deionized water into a sixth vessel, and stirring the mixture till the second film former is dissolved;

4) adding into a preparation vessel successively the following:

a) water accounting for 10%-30% of the total mass of the sizing composition to be prepared;

b) the pre-dispersed first silane coupling agent and the pre-dispersed second silane coupling agent obtained in step 1);

c) the pre-dissolved and diluted first film former and the pre-dissolved and diluted second film former obtained in step 3);

d) the pre-dissolved first lubricant and the pre-dissolved second lubricant obtained in step 2); and e) the remainder of deionized water;

stirring and uniformly mixing to obtain the sizing composition for glass fiber direct roving for producing multiaxial fabrics.

Further, the sizing composition is prepared as described below:

1) an amount of deionized water is added to the first disperser, the deionized water has a mass of 20-50 times the mass of the first silane coupling agent, part of pH regulator is used to regulate the pH value of the deionized water to be 3.5-4.0, then the first silane coupling agent is added slowly to the deionized water under stirring at a rate of 50-200 r/min, and stirring for 15-30 minutes, and the first pre-dispersed silane coupling agent is obtained;

an amount of deionized water is added to the second disperser, the deionized water has a mass of 0.2-2.0 times the mass of the second silane coupling agent, the remaining pH regulator and the second silane coupling agent are added to the deionized water under stirring at a rate of 50-200 r/min, and stirring for 15-30 minutes, and then add deionized water with a mass 15-30 times the mass of the second silane coupling agent, and the second pre-dispersed silane coupling agent is thus obtained;

2) an amount of deionized water is added to the third vessel, the deionized water has a mass of 5-10 times the mass of the first lubricant, then add the first lubricant slowly and stir the mixture till the lubricant is fully dissolved, thus the pre-dissolved first lubricant is obtained;

an amount of deionized water is added to the fourth vessel, the deionized water has a temperature of 40-60° C. and a mass of 10-20 times the mass of the second lubricant, then slowly add the second lubricant and stir the mixture till the lubricant is fully dissolved, thus the pre-dissolved second lubricant is obtained;

3) the first film former and an amount of water are added successively to the fifth vessel, the water has a mass 1-2 times the mass of the first film former, stir the mixture for 5-15 minutes till the film former is fully dissolved, and the pre-dissolved and diluted first film former is thus obtained;

or alternatively, when a plasticizer is used in preparing the sizing composition, the first film former is first added to the fifth vessel, and then the plasticizer is dripped into the fifth vessel at a rate of 2-12 g/min while stirring the mixture at a rate of 20-150 r/min, stir the mixture for a period of 2-48 hours for plasticization, and then add a mass of water that is 1-2 times the mass of the first film former, stir the mixture for 5-15 minutes till it is fully homogenized, and the pre-dissolved and diluted first film former is obtained;

the second film former and an amount of water 1-2 times the mass of the second film former are successively added to the sixth vessel, stir the mixture for a period of time till it is fully homogenized, and the pre-dissolved and diluted second film former is obtained;

4) the following components are successively added to the preparation vessel:

a) an amount of water accounting for 10%-30% by mass of the total mass of the sizing composition to be prepared;

b) the pre-dispersed first silane coupling agent and the pre-dispersed second silane coupling agent obtained in step 1);

c) the pre-dissolved and diluted first film former and the pre-dissolved and diluted second film former obtained in step 3);

d) the pre-dissolved and diluted first lubricant and the pre-dissolved and diluted second lubricant obtained in step 2); and e) the remainder of deionized water;

stir the resulting mixture for 10-30 minutes, and the sizing composition for glass fiber direct roving for producing multiaxial fabrics is obtained.

A further aspect of the present application relates to a use of the sizing composition described above in producing glass fiber multiaxial fabrics.

Compared with the prior art, the sizing composition according to the present application has good compatibility with the matrix epoxy resin. In addition, the film former in the sizing composition can react with the matrix epoxy resin, which helps to improve the mechanical strength and stability of the composite materials. When applied on the surface of glass fiber, the sizing composition can ensure that the coating of the sizing in the glass fiber multiaxial fabrics to be made has a moderate and suitable dissolution rate in the resin, the dissolution rate being neither too fast nor too slow, so that a full wet-out of the fabrics by the resin will be guaranteed; what's more, the coated glass fiber in the fabrics has good bonding with the resin. The sizing composition also enables the sized glass fiber to have low fuzz and smooth weaving performance in the subsequent process.

DETAILED DESCRIPTION

The technical solutions according to the present application will be described clearly and completely below with reference to the specific embodiments of the present application. Apparently, the described embodiments are just some but not all of the embodiments of the present application. All other embodiments obtained by a person of ordinary skill in the art based on the embodiments of the present application without performing any creative work shall fall into the protection scope of the present application. It is to be noted that the embodiments in the present application and the features in the embodiments can be combined at will if not conflicted.

In the sizing composition for glass fiber direct roving for producing multiaxial fabrics according to the present application, the solids content of the sizing composition accounts for 10-15% of the total mass of the sizing composition, and the remainder is deionized water. The sizing composition comprises: 0.1-5.0% of a first silane coupling agent, 2.5-11.0% of a second silane coupling agent, 3.0-20.0% of a first film former, 45.0-75.0% of a second film former, 0-5.0% of a plasticizer, 0.2-4.0% of a first lubricant, 5.0-20.0% of a second lubricant, and 0.01-3.0% of a pH regulator, as expressed in solid mass percentage based on the total solids mass of the composition.

Preferably, the sizing composition comprises: 0.5-1.5% of the first silane coupling agent, 3.5-7.0% of the second silane coupling agent, 7.0-16.0% of the first film former, 50.0-65.0% of the second film former, 0-3.0% of the plasticizer, 0.5-2.0% of the first lubricant, 9.0-16.0% of the second lubricant, and 0.01-2.00% of the pH regulator, as expressed in solid mass percentage based on the total solids mass of the composition.

Wherein, the first film former is a multifunctional epoxy emulsion, which is a polyphenol epoxy emulsion and/or a glycidyl amine epoxy emulsion. The polyphenol epoxy emulsion is one or more of a 4,4'-diamino diphenyl methane tetrafunctional epoxy resin emulsion, a triglycidyl p-amino-phenol trifunctional epoxy emulsion, and an epoxidized m-xylylenediamine tetrafunctional epoxy resin emulsion; and the glycidyl amine epoxy emulsion is one or more of a dicyclopentadiene phenol glycidyl ester resin, an epoxidized m-xylylenediamine, a 1, 1, 1-tris (p-hydroxyphenyl) ethane glycidyl ether trifunctional epoxy emulsion, a tetra (4-hy-droxyphenyl) ethane tetraglycidyl ether tetrafunctional epoxy emulsion, and a 1,3-bis (N, N-diglycidyl aminom-ethyl) cyclohexane tetrafunctional epoxy emulsion;

the second film former is a low-molecular-weight liquid epoxy emulsion, which is one or more of a glycidyl ester epoxy emulsion, an aliphatic glycidyl ether epoxy emulsion, a bisphenol A epoxy emulsion, a bisphenol F epoxy emulsion, a bisphenol AD epoxy emulsion, and a bisphenol S epoxy emulsion; and the low-molecular-weight liquid epoxy emulsion has an epoxy equivalent of 180-300 and an emulsion particle size of 0.2-2.0 microns;

the first silane coupling agent is one or more of a γ-aminopropyl triethoxy silane, a γ-aminopropyl trimethoxy silane, an N-β-(aminoethyl)-γ-aminopropyl trimethoxy silane, a γ-glycidyl etherpropyl trimethoxy silane, a 3-glycidyl propyl methoxydiethyloxy silane, and a γ-methacryloyloxypropyl trimethoxy silane;

the second silane coupling agent is one or more of an N-phenyl-N-aminoethyl-γ-aminopropyl trioxysilane hydrochloride, a cationic styrene aminotrimethoxy silane, and a polynitrogen amide silane;

the plasticizer is one or more of a saturated polyester plasticizer, a polymeric benzoate ester plasticizer, a benzoate ester plasticizer, an adipate polymer plasti-cizer, and a polyol ester plasticizer;

the first lubricant is one or more of a fatty acid amine, a fatty amide polycondensate, and an epoxy modified phenylsiloxane; the second lubricant is a PEG lubri-cant; and, the pH regulator is one or more of a citric acid, a boric acid, a formic acid, an acetic acid, and an organic amine.

The method of preparing the sizing composition accord-ing to the present application comprises the following steps:

1) an amount of deionized water is added to a first disperser, the deionized water has a mass of 20-50 times the mass of the first silane coupling agent, part of pH regulator is used to regulate the pH value of the deionized water to be 3.5-4.0, then the first silane coupling agent is added slowly to the deionized water being stirred at a rate of 50-200 r/min, and stirring for 15-30 minutes, and the first pre-dispersed silane cou-pling agent is obtained;

an amount of deionized water is added to a second disperser, the deionized water has a mass of 0.2-2.0 times the mass of the second silane coupling agent, the remaining pH regulator and the second silane coupling agent are added to the deionized water being stirred at a rate of 50-200 r/min, and stirring for 15-30 minutes, and then slowly add deionized water with a mass of 15-30 times of the second silane coupling agent, and the second pre-dispersed silane coupling agent is thus obtained;

2) an amount of deionized water is added to a third vessel, the deionized water has a mass of 5-10 times the mass of the first lubricant, then add the first lubricant slowly and stir the mixture till the lubricant is fully dissolved, thus the pre-dissolved first lubricant is obtained;

an amount of deionized water is added to a fourth vessel, the deionized water has a temperature of 40-60° C. and a mass of 10-20 times the mass of the second lubricant, then slowly add the second lubricant and stir the mixture till the lubricant is fully dissolved, thus the pre-dissolved second lubricant is obtained;

3) the first film former and an amount of water are successively added to a fifth vessel, the water has a mass 1-2 times the mass of the first film former, stir the mixture for 5-15 minutes till the film former is fully dissolved, and the pre-dissolved and diluted first film former is thus obtained;

or alternatively, when a plasticizer is used, the first film former is first added to a fifth vessel, and then the plasticizer is dripped into the fifth vessel at a rate of 2-12 g/min under stirring at a rate of 20-150 r/min, stir the mixture for a period of 2-48 hours for plasticization, and then add a mass of water that is 1-2 times the mass of the first film former, stir the mixture for 5-15 minutes till it is fully homogenized, and the pre-dissolved and diluted first film former is thus obtained;

the second film former and an amount of water 1-2 times the mass of the second film former are added to a sixth vessel, stir the mixture for a period of time till it is fully homogenized, and the pre-dissolved and diluted second film former is obtained;

4) the following components are successively added to a preparation vessel:

a) an amount of water accounting for 10%-30% by mass of the total mass of the sizing composition to be prepared;

b) the pre-dispersed first silane coupling agent and the pre-dispersed second silane coupling agent obtained in step 1);

c) the pre-dissolved and diluted first film former and the pre-dissolved and diluted second film former obtained in step 3);

d) the pre-dissolved and diluted first lubricant and the pre-dissolved and diluted second lubricant obtained in step 2); and e) the remainder of deionized water;

stir the resulting mixture for 10-30 minutes, and the sizing composition for glass fiber direct roving for producing multiaxial fabrics is obtained.

The examples below illustrate some exemplary embodi-ments of the present application.

EXAMPLES

TABLE 1

Examples Illustrating the Sizing Compositions of the Present Application

| Component/% (and LOI) | Example 1 | Example 2 | Example 3 | Example 4 | Example 5 | Example 6 | Example 7 | Example 8 | Example 9 | Example 10 |
|---|---|---|---|---|---|---|---|---|---|---|
| First silane coupling agent | 0.5 | 0.6 | 0.7 | 0.8 | 0.8 | 1.2 | 1 | 1.4 | 4.5 | 3 |
| Second silane coupling agent | 7 | 7 | 5.6 | 6 | 5 | 5 | 6 | 4 | 3 | 10 |
| First film former | 7 | 12 | 9 | 16 | 12 | 11 | 14 | 16 | 20 | 4 |
| Second film former | 64.92 | 63.4 | 65 | 60 | 62.3 | 63.2 | 61 | 63.4 | 46 | 70 |
| Plasticizer | — | 0.2 | 0.5 | 0.4 | 2 | 1 | 2 | 3 | 3.5 | 5 |
| First lubricant | 0.5 | 0.6 | 1 | 1.2 | 1.5 | 1.5 | 1.5 | 2 | 4 | 0.2 |
| Second lubricant | 20 | 16 | 18 | 15 | 16 | 17 | 14.2 | 10 | 16 | 5 |
| Citric acid | 0.08 | 0.2 | 0.2 | 0.6 | 0.4 | 0.1 | 0.3 | 0.2 | 3 | 2.8 |
| LOI (%) | 0.54 | 0.56 | 0.55 | 0.53 | 0.56 | 0.54 | 0.57 | 0.53 | 0.55 | 0.53 |

The components in the sizing compositions respectively under Examples 1-10 of Table 1 are as follows:

the first silane coupling agent: A-187, available from Momentive, γ-glycidyl etherpropyl trimethoxy silane;

the second silane coupling agent: OFS-6032, available from Dow Corning, cationic styrene aminotrimethoxy silane;

the first film former: TX-612, available from Jushi Group, triglycidyl p-aminophenol emulsion;

the second film former: EPI-REZ 3510-W-60, available from HEXION, bisphenol A epoxy emulsion;

the first lubricant: epoxy modified phenyl siloxane emulsion, available from Shanghai Shinchem Chemical Products;

the second lubricant: PEG400MO, available from Toho Chemical Industry;

the plasticizer: Neoxil 9166, available from AOC, saturated polyester; and the pH regulator: citric acid, available from SINOPEC.

It is to be noted that the specific types and contents of the above-mentioned components do not constitute a limitation of the protection scope of the present application.

the first film former: A: TX-686, available from Jushi Group, epoxidized m-xylylenediamine tetrafunctional epoxy resin; and B: TX-688, available from Jushi Group, dicyclopentadiene phenol glycidyl ester resin;

the second film former: TX-613, available from Jushi Group, bisphenol F epoxy emulsion;

the first lubricant: CATIONIC Softener Conc. Flake, available from EVONIK INDUSTRIES, fatty acid amine;

the second lubricant: PEG400 Monopelargonate, available from Pulcra Chemicals;

the plasticizer: BENZOFLEX 50, available from Eastman Specialties Wuhan Youji Chemical, polymeric benzoate ester plasticizer; and the pH regulator: acetic acid, available from SINOPEC.

In order to further demonstrate the beneficial effects of the present application, comparisons are made between the sizing compositions of the present application and the sizing compositions of reference examples by testing the properties

TABLE 2

Examples Illustrating the Sizing Compositions of the Present Application (continued)

| Component/% (and LOI) | | Example 11 | Example 12 | Example 13 | Example 14 | Example 15 | Example 16 | Example 17 | Example 18 | Example 19 | Example 20 |
|---|---|---|---|---|---|---|---|---|---|---|---|
| First silane coupling agent | | 0.2 | 5 | 1.4 | 1.5 | 0.5 | 1.2 | 4 | 2.5 | 3.5 | 0.8 |
| Second silane coupling agent | | 10.5 | 3.5 | 6.5 | 4 | 7 | 6.5 | 2.5 | 8 | 6 | 11 |
| First film | A | 4 | 3 | 9 | 13 | 11 | — | 20 | — | 1 | 5 |
| former | B | 1.5 | 7.3 | — | 3 | 2 | 14 | — | 3 | 6 | 4 |
| Second film former | | 71.45 | 75 | 64 | 56 | 61.6 | 65 | 46 | 67 | 61.2 | 68 |
| Plasticizer | | 2 | — | 2.5 | 2.5 | 1 | 3 | 1.5 | 3.3 | 5 | 0.5 |
| First lubricant | | 0.2 | 1 | 1.8 | 2 | 1 | 0.5 | 4 | 2 | 0.8 | 3.5 |
| Second lubricant | | 10.1 | 5 | 14.3 | 16 | 15.5 | 9 | 20 | 14 | 15 | 4.2 |
| Acetic acid | | 0.05 | 0.2 | 0.5 | 2 | 0.4 | 0.8 | 2 | 0.2 | 1.5 | 3 |
| LOI (%) | | 0.56 | 0.55 | 0.55 | 0.53 | 0.54 | 0.54 | 0.57 | 0.54 | 0.55 | 0.56 |

The components in the sizing compositions respectively under Examples 11-20 of Table 2 are as follows:

the first silane coupling agent: A-174, available from Momentive, γ-methacryloyloxypropyl trimethoxy silane;

the second silane coupling agent: A-1387, available from Jushi Group, polynitrogen amide silane;

of these compositions and the properties of reinforced composites containing these compositions. The specific test results are given below in Tables 3-5. The sizing composition of each of the reference examples 1-4 comprises the following components expressed in solid mass percentage based on the total solids mass of the corresponding composition.

Reference Example 1 a first silane coupling agent: 10% of A-187, available from Momentive, γ-glycidyl etherpropyl trimethoxy silane;

a second silane coupling agent: 15% of OFS-6032, available from Dow Corning, cationic styrene aminotrimethoxy silane;

a first film former: 25% of TX-612, available from Jushi Group, multifunctional triglycidyl p-aminophenol emulsion;

a second film former: 40.97% of EPI-REZ 3510-W-60, available from HEXION, bisphenol A epoxy emulsion;

a first lubricant: 6% of epoxy modified phenyl siloxane emulsion, available from Shanghai Shinchem Chemical Products;

a second lubricant: 0.02% of PEG400MO, available from Toho Chemical Industry;

a plasticizer: 3% of Neoxil 9166, available from AOC, saturated polyester; and pH regulator: 0.01% of citric acid, available from SINO-PEC.

Reference Example 2 coupling agent: 15% of A-187, available from Momentive, γ-glycidyl etherpropyl trimethoxy silane;

lubricant: 15% of epoxy modified phenyl siloxane emulsion, available from Shanghai Shinchem Chemical Products; and 9% of Katex6760, available from Pulcra Chemicals, polyethyleneimine salt;

film former: 60.9% of EPI-REZ 3510-W-60, available from HEXION, bisphenol A epoxy emulsion;

pH regulator: 0.1% of citric acid, available from SINO-PEC.

Reference Example 3 coupling agent: 15% of A-187, available from Momentive, γ-glycidyl etherpropyl trimethoxy silane;

lubricant: 5% of Katex8760, available from Pulcra Specialty Chemicals (Shanghai); and 15% of PEG400MO, available from Toho Chemical Industry;

film former: 64.9% of EPI-REZ 3510-W-60, available from HEXION, bisphenol A epoxy emulsion;

pH regulator: 0.1% of acetic acid, available from SINO-PEC.

Reference Example 4 coupling agent: 10% of A-174, available from Momentive, γ-methacryloyloxypropyl trimethoxy silane; and 5% of A-1100, available from Momentive, γ-aminopropyl triethoxysilane;

lubricant: 10% of Katex8760, available from Pulcra Specialty Chemicals (Shanghai); and 15% of PEG400MO, available from Toho Chemical Industry;

film former: 58% of EPI-REZ 3510-W-60, available from HEXION, bisphenol A epoxy emulsion;

pH regulator: 2% of acetic acid, available from SINO-PEC.

TABLE 3

Tested Properties and Their Comparison

| Tested property | Example 1 | Example 2 | Example 3 | Example 4 | Example 5 | Example 6 | Example 7 | Example 8 |
|---|---|---|---|---|---|---|---|---|
| Fuzz amount (mg/1000 m) | 12 | 13 | 6 | 11 | 8 | 15 | 14 | 6 |
| Dissolution rate in acetone (%) | 83 | 78 | 85 | 70 | 79 | 81 | 78 | 73 |
| 90° Tensile strength (MPa) | 58 | 64 | 59 | 63 | 65 | 61 | 63 | 62 |
| Shear strength (MPa) | 72.4 | 78.2 | 71.7 | 70.1 | 78.9 | 70.5 | 73.3 | 75.1 |
| Glass fiber content (%) | 75.2 | 75.0 | 74.9 | 75.3 | 75.1 | 75.4 | 74.8 | 74.8 |
| LOI (%) | 0.54 | 0.56 | 0.55 | 0.53 | 0.56 | 0.54 | 0.57 | 0.53 |

TABLE 4

Tested Properties and Their Comparison (continued)

| Tested property | Example 9 | Example 10 | Example 11 | Example 12 | Example 13 | Example 14 | Example 15 | Example 16 |
|---|---|---|---|---|---|---|---|---|
| Fuzz amount (mg/1000 m) | 9 | 11 | 12 | 12 | 10 | 11 | 12 | 8 |
| Dissolution rate in acetone (%) | 73 | 81 | 76 | 74 | 72 | 73 | 74 | 74 |
| 90° Tensile strength (MPa) | 60 | 61 | 61 | 62 | 65 | 63 | 63 | 64 |
| Shear strength (MPa) | 70.3 | 71.2 | 70.9 | 70.9 | 74.8 | 72.8 | 73.8 | 74.3 |
| Glass fiber content (%) | 74.9 | 75.0 | 74.7 | 74.9 | 75.0 | 75.2 | 74.9 | 75.1 |
| LOI (%) | 0.55 | 0.56 | 0.56 | 0.55 | 0.55 | 0.53 | 0.54 | 0.54 |

TABLE 5

| | | | | Tested Properties and Their Comparison (continued) | | | | |
|---|---|---|---|---|---|---|---|---|
| Tested property | Example 17 | Example 18 | Example 19 | Example 20 | Ref. example 1 | Ref. example 2 | Ref. example 3 | Ref. example 4 |
| Fuzz amount (mg/1000 m) | 9 | 10 | 9 | 11 | 17 | 18 | 10 | 20 |
| Dissolution rate in acetone (%) | 75.2 | 77.8 | 79 | 80 | 68 | 92 | 93 | 89 |
| 90° Tensile strength (MPa) | 60 | 61 | 62 | 60 | 54 | 46 | 41 | 48 |
| Shear strength (MPa) | 70.2 | 72.3 | 72.1 | 70.1 | 68 | 66 | 60 | 67 |
| Glass fiber content (%) | 74.9 | 74.8 | 75.0 | 74.7 | 74. | 75.1 | 74.9 | 75.0 |
| LOI (%) | 0.57 | 0.54 | 0.55 | 0.56 | 0.57 | 0.56 | 0.55 | 0.58 |

The above test data are obtained by using the commonly available methods of testing glass fiber products, which belong to the common general knowledge in the art. A comparison of the test data for the examples 1-20 of the present application and for the reference examples show that the values of the fuzz amount, dissolution rate in acetone, 90° tensile strength, and shear strength in the exemplary examples of the present application are all significantly better than those in the reference examples. This means the exemplary examples of the present application have the advantages of low fuzz, appropriate acetone dissolution rate, and excellent tensile strength and shear strength. The content of each component in the sizing compositions respectively under examples 1-20 is appropriate and reasonable, and the mechanical strength rendered by each composition is high, which meets the process requirements for producing multiaxial fabrics.

In conclusion, the sizing composition according to the present application has good compatibility with the matrix epoxy resin. In addition, the film former in the sizing composition can react with the matrix epoxy resin, which helps to improve the mechanical strength and stability of the composite materials. When applied on the surface of glass fiber, the sizing composition can ensure that the coating of the sizing in the glass fiber multiaxial fabrics to be made has a moderate and suitable dissolution rate in the resin, the dissolution rate being neither too fast nor too slow, so that a full wet-out of the fabrics by the resin will be guaranteed; what's more, the coated glass fiber in the fabrics has good bonding with the resin. The sizing composition also enables the sized glass fiber to have low fuzz and smooth weaving performance in the subsequent process.

The contents described above can be implemented independently or in combination in various ways, and these transformations shall fall into the protection scope of the present application.

Finally, it is to be noted that the foregoing exemplary embodiments are used merely for the purpose of describing the technical solutions of the present application and not intended to constitute any limitations thereto. Although the present application has been specifically described with reference to the foregoing embodiments, it should be understood by a person of ordinary skill in the art that modifications can be made to the technical solutions described in the embodiments, and equivalent replacements can be made to some technical features of the solutions; and these modifications or equivalent replacements shall not make the essence of corresponding technical solutions depart from the spirit and scope of the technical solutions described in the embodiments of the present application.

INDUSTRIAL APPLICABILITY

The sizing composition for glass fiber direct roving for producing multiaxial fabrics according to the present appli-cation has a suitable dissolution rate in the resin, and has good compatibility with the resin. It can modify the physical and chemical properties of the surface of glass fiber, improve various performances of glass fiber, and thus meet the process requirements for producing glass fiber multiaxial fabrics. The wind turbine blades made from the glass fiber multiaxial fabrics containing the sizing composition according to the present application have such advantages as stable mechanical strength, excellent fatigue resistance, and longer service life.

The invention claimed is:

1. A sizing composition for glass fiber direct roving for producing multiaxial fabrics, the sizing composition comprising the following components, a solid mass of each of the following components accounting for a total solids mass of the sizing composition expressed in percentage by mass as follows:

| | |
|---|---|
| a first silane coupling agent | 0.1-5.0%; |
| a second silane coupling agent | 2.5-11.0%; |
| a first film former | 3.0-20.0%; |
| a second film former | 45.0-75.0%; |
| a plasticizer | 0-5.0%; |
| a first lubricant | 0.2-4.0%; |
| a second lubricant | 5.0-20.0%; and |
| pH regulator | 0.01-3.0%; | wherein the first film former is at least one of a triglycidyl p-aminophenol trifunctional epoxy emulsion, an epoxidized m-xylylenediamine tetrafunctional epoxy resin emulsion, a dicyclopentadiene phenol glycidyl ester resin, or a 1,3-bis (N, N-diglycidyl aminomethyl) cyclohexane tetrafunctional epoxy resin emulsion; and the second film former is a liquid epoxy emulsion; and a solids mass of the sizing composition accounts for 10-15% of a total mass of the sizing composition, and a remainder of the sizing composition is deionized water;

wherein the first lubricant is one or more of a fatty acid amine and an epoxy modified phenylsiloxane; and the second lubricant is a polyethylene glycol (PEG) lubricant;

wherein the first silane coupling agent is one or more of a γ-aminopropyl triethoxy silane, a γ-aminopropyl trimethoxy silane, an N-β-(aminoethyl)-γ-aminopropyl trimethoxy silane, a γ-glycidyl etherpropyl trimethoxy silane, a 3-glycidyl propyl methoxydiethyloxy silane, and a γ-methacryloyloxypropyl trimethoxy silane; and the second silane coupling agent is one or more of an N-phenyl-N-aminoethyl-γ-aminopropyl trioxysilane hydrochloride, a cationic styrene aminotrimethoxy silane, and a polynitrogen amide silane.

2. The sizing composition according to claim 1, wherein, the sizing composition comprises the following components expressed in percentage by mass:

| | |
|---|---|
| the first silane coupling agent | 0.5-1.5%; |
| the second silane coupling agent | 3.5-7.0%; |
| the first film former | 7.0-16.0%; |
| the second film former | 50.0-65.0%; |
| the plasticizer | 0-3.0%; |
| the first lubricant | 0.5-2.0%; |
| the second lubricant | 9.0-16.0%; and |
| the pH regulator | 0.01-2.00%. |

3. The sizing composition according to claim 1, wherein, the liquid epoxy emulsion is one or more of a glycidyl ester epoxy emulsion, an aliphatic glycidyl ether epoxy emulsion, a bisphenol A epoxy emulsion, a bisphenol F epoxy emulsion, a bisphenol AD epoxy emulsion, and a bisphenol S epoxy emulsion.

4. The sizing composition according to claim 1, wherein, the plasticizer is one or more of a saturated polyester plasticizer, a polymeric benzoate ester plasticizer, a benzoate ester plasticizer, an adipate polymer plasticizer, and a polyol ester plasticizer.

5. A method of preparing a sizing composition, comprising the following steps:

1) pre-dispersing a first silane coupling agent and a second silane coupling agent in the process as described below:

adding deionized water and some pH regulator into a first vessel, and adding, under stirring, the first silane coupling agent into the first vessel; and adding deionized water and more of the pH regulator into a second vessel, and adding, under stirring, the second silane coupling agent and deionized water with a mass of 15-30 times a mass of the second silane coupling agent;

2) pre-dissolving a first lubricant and a second lubricant in the process as described below:

sequentially adding deionized water and the first lubricant into a third vessel, and stirring deionized water and the first lubricant till the first lubricant is fully dissolved; and adding deionized water and the second lubricant into a fourth vessel, and stirring deionized water and the second lubricant till the second lubricant is fully dissolved;

3) pre-dissolving and diluting a first film former and a second film former in the process as described below:

adding the first film former and deionized water into a fifth vessel, and stirring the first film former and deionized water till the first film former is dissolved; and adding the second film former and deionized water into a sixth vessel, and stirring the second film former and deionized water till the second film former is dissolved;

4) adding into a preparation vessel successively the following:

a) water accounting for 10%-30% of a total mass of the sizing composition to be prepared;

b) a pre-dispersed first silane coupling agent and a pre-dispersed second silane coupling agent obtained in step 1);

c) a pre-dissolved and diluted first film former and a pre-dissolved and diluted second film former obtained in step 3);

d) a pre-dissolved first lubricant and a pre-dissolved second lubricant obtained in step 2); and e) a remainder of deionized water; and stirring and uniformly mixing to obtain the sizing composition for glass fiber direct roving for producing multiaxial fabrics;

wherein a solids mass of the sizing composition accounts for 10-15% of the total mass of the sizing composition, and the remainder of the sizing composition is the deionized water; each component accounting for a total solids mass of the sizing composition expressed in percentage by mass as follows:

| | |
|---|---|
| the first silane coupling agent | 0.1-5.0%; |
| the second silane coupling agent | 2.5-11.0%; |
| the first film former | 3.0-20.0%; |
| the second film former | 45.0-75.0%; |
| a plasticizer | 0-5.0%; |
| the first lubricant | 0.2-4.0%; |
| the second lubricant | 5.0-20.0%; and |
| the pH regulator | 0.01-3.0%; | wherein the first film former is at least one of a triglycidyl p-aminophenol trifunctional epoxy emulsion, an epoxidized m-xylylenediamine tetrafunctional epoxy resin emulsion, a dicyclopentadiene phenol glycidyl ester resin, or a 1,3-bis (N, N-diglycidyl aminomethyl) cyclohexane tetrafunctional epoxy resin emulsion; and the second film former is a liquid epoxy emulsion; and a solids mass of the sizing composition accounts for 10-15% of a total mass of the sizing composition, and a remainder of the sizing composition is deionized water;

wherein the first lubricant is one or more of a fatty acid amine and an epoxy modified phenylsiloxane; and the second lubricant is a polyethylene glycol (PEG) lubricant;

wherein the first silane coupling agent is one or more of a γ-aminopropyl triethoxy silane, a γ-aminopropyl trimethoxy silane, an N-β-(aminoethyl)-γ-aminopropyl trimethoxy silane, a γ-glycidyl etherpropyl trimethoxy silane, a 3-glycidyl propyl methoxydiethyloxy silane, and a γ-methacryloyloxypropyl trimethoxy silane; and the second silane coupling agent is one or more of an N-phenyl-N-aminoethyl-γ-aminopropyl trioxysilane hydrochloride, a cationic styrene aminotrimethoxy silane, and a polynitrogen amide silane.

6. An application of the sizing composition according to claim 1 for producing glass fiber multiaxial fabrics.

7. The sizing composition according to claim 1, wherein, the liquid epoxy emulsion has an epoxy equivalent of from 180 to 300 and an emulsion particle size of from 0.2 microns to 2.0 microns.

8. The sizing composition according to claim 1, wherein, the pH regulator is one or more of a citric acid, a boric acid, a formic acid, an acetic acid, and an organic amine.

9. The method of preparing the sizing composition according to claim 5, comprising the following steps:

1) pre-dispersing the first silane coupling agent and the second silane coupling agent in the process as described below:

adding an amount of deionized water to the first vessel, the deionized water having a mass of 20-50 times a mass of the first silane coupling agent, using part of the pH regulator to regulate a pH value of the deionized water to be 3.5-4.0, then slowly adding the first silane coupling agent to the deionized water being stirred at a rate of 50-200 r/min, and stirring for 15-30 minutes, and thus the pre-dispersed first silane coupling agent is obtained; and adding an amount of deionized water to the second vessel, the deionized water having a mass of 0.2-2.0 times the mass of the second silane coupling agent, adding the remaining pH regulator and the second silane coupling agent to the deionized water being stirred at a rate of 50-200 r/min, and stirring for 15-30 minutes, and then slowly adding deionized water with a mass of 15-30 times of the second silane coupling agent, and thus the pre-dispersed second silane coupling agent is obtained;

2) pre-dissolving the first lubricant and the second lubricant in the process as described below:

adding an amount of deionized water to the third vessel, the deionized water having a mass of 5-10 times a mass of the first lubricant, then adding the first lubricant slowly and stirring mixture till the first lubricant is fully dissolved, thus the pre-dissolved first lubricant is obtained; and adding an amount of deionized water to the fourth vessel, the deionized water having a temperature of 40-60° C. and a mass of 10-20 times a mass of the second lubricant, then slowly adding the second lubricant and stirring the mixture till the second lubricant is fully dissolved, thus the pre-dissolved second lubricant is obtained;

3) pre-dissolving and diluting the first film former and the second film former in the process as described below:

successively adding the first film former and an amount of water to the fifth vessel, the water having a mass 1-2 times a mass of the first film former, stirring the mixture for 5-15 minutes till the first film former is fully dissolved, thus the pre-dissolved and diluted first film former is obtained;

or alternatively, when the plasticizer is used, first adding the first film former to the fifth vessel, and then dripping the plasticizer into the fifth vessel at a rate of 2-12 g/min under stirring at a rate of 20-150 r/min, stirring the mixture for a period of 2-48 hours for plasticization, and then adding a mass of water that is 1-2 times the mass of the first film former, stirring the mixture for 5-15 minutes till it is fully homogenized, thus the pre-dissolved and diluted first film former is obtained; and adding the second film former and an amount of water 1-2 times a mass of the second film former to the sixth vessel, stirring the mixture for a period of time till it is fully homogenized, thus the pre-dissolved and diluted second film former is obtained; and 4) adding into the preparation vessel successively the following:

a) an amount of water accounting for 10%-30% by mass of the total mass of the sizing composition to be prepared;

b) the pre-dispersed first silane coupling agent and the pre-dispersed second silane coupling agent obtained in step 1);

c) the pre-dissolved and diluted first film former and the pre-dissolved and diluted second film former obtained in step 3);

d) the pre-dissolved first lubricant and the pre-dissolved second lubricant obtained in step 2); and e) the remainder of deionized water; and stirring the resulting mixture for 10-30 minutes, to obtain the sizing composition for glass fiber direct roving for producing multiaxial fabrics.

\* \* \* \* \*